(12) United States Patent
Jia et al.

(10) Patent No.: US 8,836,658 B1
(45) Date of Patent: Sep. 16, 2014

(54) METHOD AND APPARATUS FOR DISPLAYING A PLURALITY OF ITEMS

(75) Inventors: Ming Jia, Sunnyvale, CA (US); Daniel Marc Gatan Shiplacoff, Los Altos, CA (US); James Brooks Miller, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 267 days.

(21) Appl. No.: 13/362,617

(22) Filed: Jan. 31, 2012

(51) Int. Cl.
*G06F 3/041* (2006.01)

(52) U.S. Cl.
USPC .......................................... 345/173; 715/850

(58) Field of Classification Search
None
See application file for complete search history.

(56) References Cited

U.S. PATENT DOCUMENTS

| | | | |
|---|---|---|---|
| 5,588,097 A | 12/1996 | Ono et al. | |
| 5,588,098 A | 12/1996 | Chen et al. | |
| 6,880,132 B2 | 4/2005 | Uemura | |
| 7,013,435 B2 | 3/2006 | Gallo et al. | |
| 7,562,312 B2 | 7/2009 | Rochford et al. | |
| 8,493,384 B1 | 7/2013 | Reisman et al. | |
| 2004/0100479 A1* | 5/2004 | Nakano et al. | 345/700 |
| 2004/0155907 A1* | 8/2004 | Yamaguchi et al. | 345/810 |
| 2005/0086611 A1* | 4/2005 | Takabe et al. | 715/823 |
| 2008/0062141 A1* | 3/2008 | Chandhri | 345/173 |
| 2009/0002335 A1 | 1/2009 | Chaudhri | |
| 2009/0019401 A1 | 1/2009 | Park et al. | |
| 2010/0058242 A1* | 3/2010 | Kimoto | 715/830 |
| 2010/0192100 A1* | 7/2010 | Wu et al. | 715/834 |
| 2010/0229088 A1 | 9/2010 | Nakajima et al. | |
| 2011/0096089 A1 | 4/2011 | Shenhav et al. | |
| 2013/0083005 A1 | 4/2013 | Arrasvuori | |
| 2013/0111395 A1 | 5/2013 | Ying et al. | |
| 2013/0167074 A1 | 6/2013 | Oonishi et al. | |
| 2013/0326583 A1 | 12/2013 | Freihold et al. | |

OTHER PUBLICATIONS

Ditchburn, "Picking," Dec. 21, 2010, retrieved from https://web.archive.org/web/20101221091638/http://toymaker.info/Games/html/picking.html, 3 pp.

* cited by examiner

*Primary Examiner* — Adam R Giesy
(74) *Attorney, Agent, or Firm* — Shumaker & Sieffert, P.A.

(57) ABSTRACT

Methods and articles for processing information to display a plurality of items. In one aspect, the method includes outputting, by a processor, data indicative of presentation of at least some of the plurality of items in a first configuration such that the plurality of items appear to be arranged for movement relative a central point; receiving an input signal indicative of a input path; determining a projection of the input path onto a notional line that corresponds to a trajectory of at least one of the plurality of items as it appears to move; and outputting data indicative of presentation of at least some of the plurality of items in a second configuration in which the plurality of items appear to have moved relative to the central point, wherein the apparent movement of the plurality of items is based at least in part on the projection.

24 Claims, 7 Drawing Sheets

METHOD AND APPARATUS FOR DISPLAYING A PLURALITY OF ITEMS

BACKGROUND

Computing devices often execute applications that allow a user to interact with a list of items. For example, an application for music playback can cause a computing device to display thumbnail images of album covers corresponding to the music available for playback. The computing device can display these album cover images in a three-dimensional perspective view, creating the impression that the album cover images reside on a carousel that rotates relative to a central point and thus sequentially present the album cover images to the user. In some cases, the user can provide an input (such as a touchscreen gesture or mouse click) that causes the computing device to output a visual effect of starting or stopping the rotation of the graphical carousel.

SUMMARY

One aspect of the disclosed implementations is a method for processing information to present a plurality of items. The method includes outputting, by a processor, data for presentation at a display device, the data indicating a first configuration of at least some of the plurality of items such that the plurality of items appear to be arranged for movement relative to a central point; receiving, at the processor, an input signal indicative of an input path along a view plane associated with the first configuration; determining, by the processor, a projection of the input path onto a notional line; and outputting, by the processor, data for presentation at a display device, the data indicating a second configuration of at least some of the plurality of items. In the second configuration, relative to the first configuration, the plurality of items appear to have moved from the first configuration relative to the central point. The notional line can correspond to a trajectory of at least one of the plurality of items as it appears to move relative to the central point. The second configuration can be based on the projection of the input path onto the notional line.

Another aspect of the disclosed implementations is a computer device for processing information to present a plurality of items. The computer system can comprise at least one memory and at least one processor. The processor can be configured to execute instructions stored in the at least one memory to: output data for presentation at a display device, the data indicating a first configuration of at least some of the plurality of items such that the plurality of items appear to be arranged for movement relative to a central point; receive an input signal indicative of an input path along a view plane associated with the first configuration; determine a projection of the input path onto a notional line; and output data for presentation at a display device, the data indicating a second configuration of at least some of the plurality of items. In the second configuration, relative to the first configuration, the plurality of items appear to have moved from the first configuration relative to the central point. The notional line can correspond to a trajectory of at least one of the plurality of items as it appears to move relative to the central point. The second configuration can be based on the projection of the input path onto the notional line.

Another aspect of the disclosed implementations is a non-transitory computer-readable medium having computer-executable instructions stored thereon. When the instructions are executed by a computing device, the instructions can cause the computing device to: output data for presentation at a display device, the data indicating a first configuration of at least some of the plurality of items such that the plurality of items appear to be arranged for movement relative to a central point; receive an input signal indicative of an input path along a view plane associated with the first configuration; determine a projection of the input path onto a notional line; and output data for presentation at a display device, the data indicating a second configuration of at least some of the plurality of items. In the second configuration, relative to the first configuration, the plurality of items appear to have moved from the first configuration relative to the central point. The notional line can correspond to a trajectory of at least one of the plurality of items as it appears to move relative to the central point. The second configuration can be based on the projection of the input path onto the notional line.

BRIEF DESCRIPTION OF THE DRAWINGS

The description herein makes reference to the accompanying drawings wherein like reference numerals refer to like parts, and wherein.

DETAILED DESCRIPTION

Figure 1:
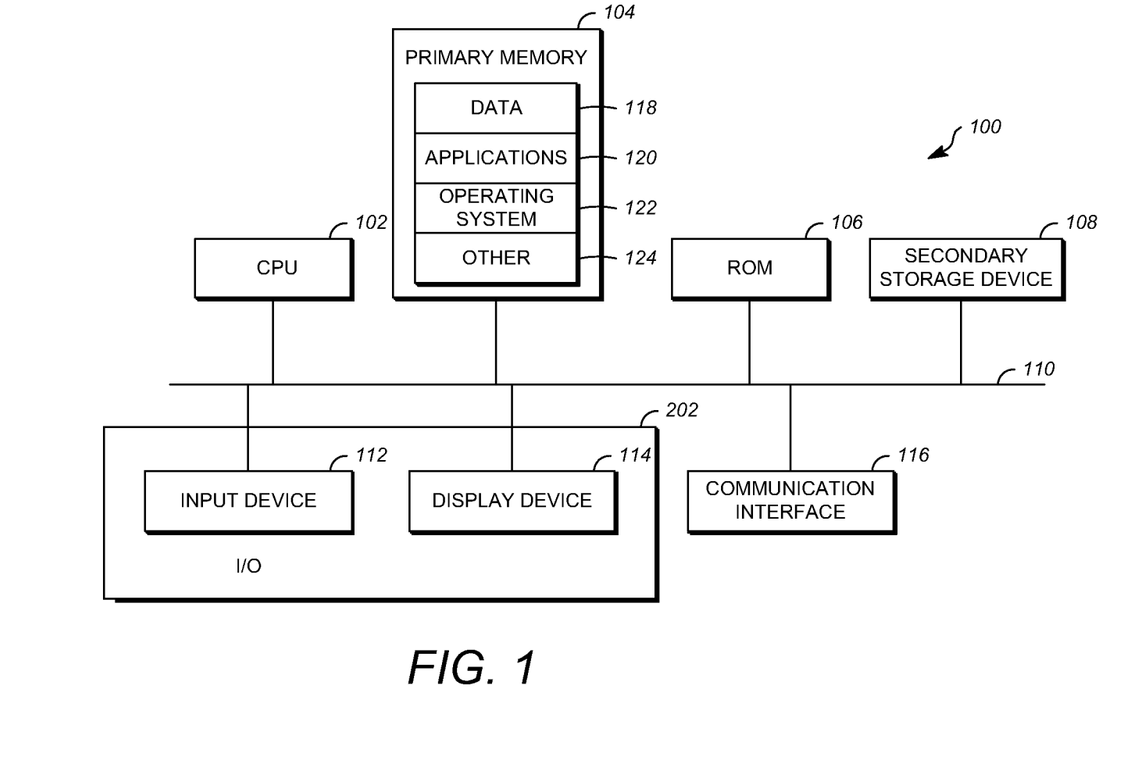
FIG. 1 is a block diagram of an example computing device, according to an implementation.

FIG. 1 is a block diagram of an example computing device 100, which, as depicted in FIG. 1, is a tablet computing device. Computing device 100 can alternatively be a personal computer, a mobile phone, a personal digital assistant, a laptop, an e-book reader, a game console, a navigation device, a wearable computer, or a combination of any two or more of these devices, or any other computing device. As shown in FIG. 1, computing device 100 can include a central processing unit (CPU) 102, at least one memory (such as, for example, a primary memory 104, a read-only memory (ROM) 106, or a secondary storage device 108), an input device 112, a display device 114, and a communication interface 116. Communication interface 116 can include any wired or wireless communication hardware for transmission and/or receipt of data or signals, via a network of any type. The various components of computing device 100 can be connected and/or coupled to at least one communication bus 110.

In some implementations, interface circuitry (such as a graphics card) can be interposed between display device 114 and communication bus 110. In such cases, output of CPU 102 can be written (for example, via communication bus 110) to the interface circuitry, which can in turn generate a signal that can cause display device 114 to display information output by CPU 102. Such interface circuitry can alternatively be interposed between input device 112 and communication bus 110. In such cases, user input can actuate input device 112, which can generate an input signal received by the interface circuitry, which in turn can be read by CPU 102 via communication bus 110. For example, in cases where input device 112 is a keyboard, input in the form of a keystroke by a user upon the keyboard can actuate the keyboard to cause the keyboard to generate an input signal received by the interface circuitry and then processed by CPU 102. As used in this specification, "user input" refers to actuating of an input device by a user (whether mechanically or electronically and whether with contact or without contact). An "input signal" refers to input information (originating from user input or otherwise) that is read by the CPU either directly or indirectly (such as through interface circuitry).

Figure 2:
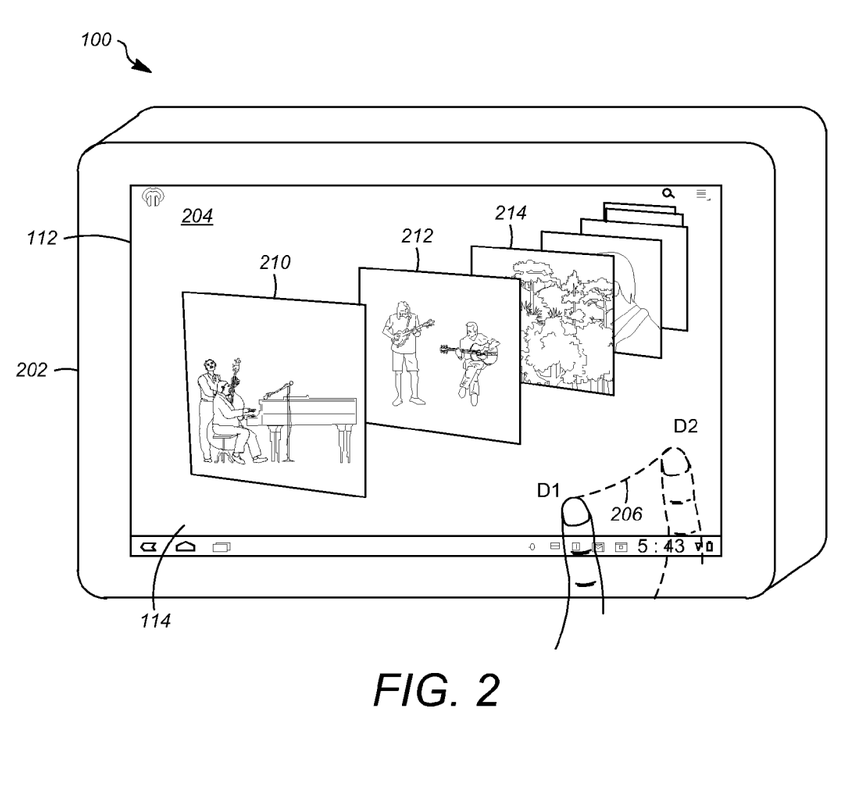
FIG. 2 is a perspective view of an example display device of the computing device of FIG. 1, showing a first example configuration of a plurality of items.
Figure 3:
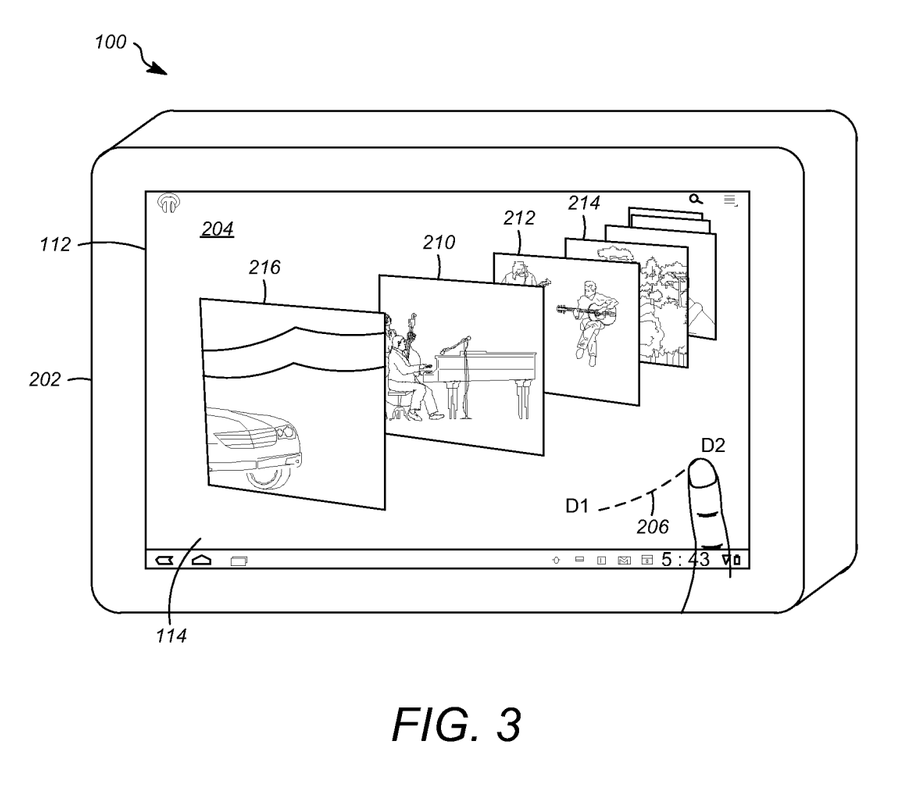
FIG. 3 is a perspective view of the example display device of FIG. 2, showing a second example configuration of the plurality of items.

In the example illustrated in FIGS. 1, 2 and 3, input device 112 and display device 114 are integrated into a touchscreen device 202. Input device 112 can be implemented in touchscreen device 202 as a touch-sensitive surface to receive inputs from a user's finger, a stylus or other instrumentality. Such inputs include, for example, single touch inputs, multi-touch inputs, gesture inputs, or any combinations of them. Touchscreen device 202 can implement input device 112 using, for example, contact-based sensing technology (e.g., a capacitance-based technology), or non-contact-based sensing technology (e.g., a video sensing technology, an infrared sensing technology, an ultrasonic sensing technology), or both. Technologies used on touchscreen device 202 can also include, for example, resistive touch sensing, surface acoustic wave touch sensing, multi-touch technologies, or other sensing technologies (e.g., optimal imaging, dispersive signal technology, acoustic pulse recognition), or any combination of the above Display device 114 can be any suitable device for displaying output from computing device 100 or other devices. For example, display device 114 can be an LCD, LED or CRT display. Display device 114 is operable to present information, including in some implementations a plurality of items, as shown in FIG. 2. The plurality of items can be, for example, a list of items stored at computing device 100. The items can include information stored as data 118, such as books, music, files, documents, songs, albums, video clips or images. The plurality of items can also be stored at a different computing device (e.g., a server) and accessed by computing device 100 through communication interface 116.

Figure 5:
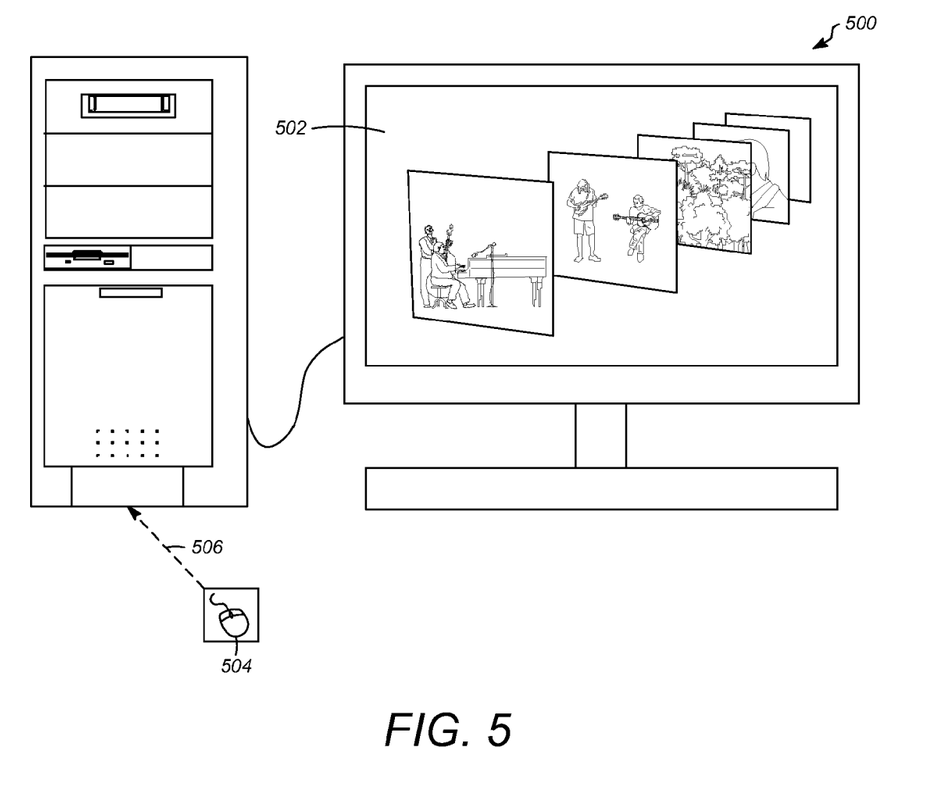
FIG. 5 is a schematic diagram of an example computing device, according to another implementation.
Figure 6:
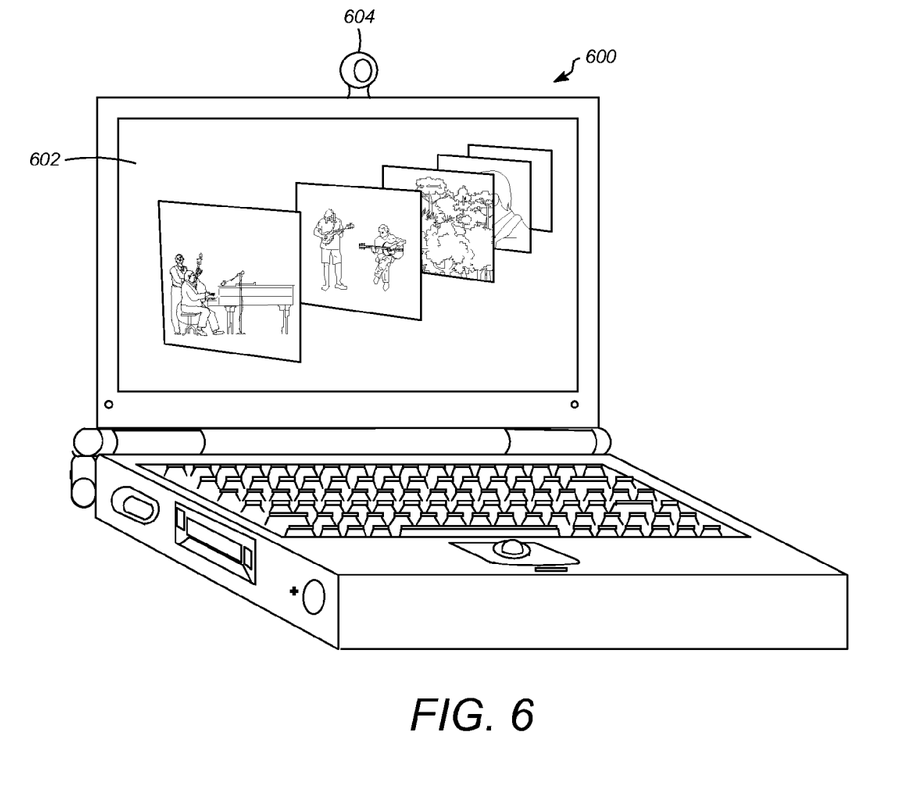
FIG. 6 is a schematic diagram of an example computing device, according to another implementation.

In other implementations, computing device 100 can receive an input signal from other types of input devices such as, for example, a touchpad, a keyboard, a hand-actuated input device (e.g., a mouse as shown in FIG. 5), a sensor (e.g., a video camera as shown in FIG. 6), a microphone, or any other input device that can be operatively coupled to the computing device 100. In such implementations, input devices need not be integrated with display device 114. In such implementations, display device 114 can be physically separate from computing device 100, and can be operatively and/or physically coupled to CPU 102, to primary memory 104, to ROM 106, to secondary storage device 108, to various input devices, and/or to communication interface 116 via one or more physical and/or logical connections and/or links.

Computing device 100 can further include various machine-readable information components stored in primary memory 104, including, for example data 118, applications 120, an operating system 122, and other components 124. Machine-readable information components 118, 120, 122, 124 can also be stored in other locations such as ROM 106 or secondary storage device 108. In some implementations, applications 120 can include instructions that, when executed by a processor such as CPU 102, can cause computing device 100 to perform operations including those described below.

Primary memory 104 can include, for example, random access memory (RAM) or other tangible computer readable medium that is directly accessible by CPU 102. Secondary storage device 108 can include any persistent computer readable medium, such as a hard disk drive, a solid state drive, a memory card, a flash memory device, a removable media, or other suitable storage medium. Although depicted as a unitary device, CPU 102 can include or comprise multiple processors. Similarly, other components of computing device 100, such as primary memory 104 and secondary storage device 108, can be deployed in multiple devices such as an array of memory units deployed on a network. References in the singular to "processor" or "memory" or other components of computing device 100 are intended to encompass implementations where multiple units (including different types of such units) are deployed to perform the functions described herein.

FIG. 2 is a perspective view of computing device 100 of FIG. 1, illustrating touchscreen device 202 integrating input device 112 and display device 114. In the example of FIG. 2, display device 114 defines a viewing surface or view plane 204 on which the plurality of items 210-214 appear to be displayed and/or viewed by the user. View plane 204 can but need not be flat and may have depth or curvature depending on the specific implementation of touchscreen device 202 (e.g., a device with a flat screen versus a non-flat screen).

For purpose of illustration, items 210-214 are thumbnail images of music albums from a larger collection of albums that are not all visible. As rendered by computing device 100, items 210-214 are displayed at view plane 204 in a three-dimensional perspective view, in which the items 210-214 appear, to the user, to be arranged for movement relative to a central point. In the example of FIG. 2, the central point is a notional point that appears to the user to be located behind the upper left corner of view plane 204. In some other implementations, the central point can appear to be positioned anywhere, such as in front of or on the view plane 204. Although only a single row of items 210-214 is presented in the example of FIG. 2, multiple rows (such as in a double-decker configuration) can be presented as well.

The visual effect of displayed items 210-214 can be likened to a carousel, revolving about the central point, with each of the items 210-214 (as well as additional items not depicted in the drawings) mounted on the periphery of the notional carousel. In the example depicted, items 210-214 appear to be arranged in front of the user, which gives the impression that the user is viewing them from outside the carousel. In some other implementations, items 210-214 can appear to be arranged around the user, which gives the impression that the user is viewing them from inside the carousel. Attributes associated with the displayed items can include, for example, number of items, first item displayed, radius, rotation angle (of the carousel), textual information, spacing between items, number of visible items, and other information relating to interactions, rendering or displaying of the items.

Optionally, special visual or other effects can be implemented on the displayed items. Special visual effects can include, for example, enlarging a selected one of items 210-214 to create a zoom-in effect; configuring items 210-214 to sway when moved or selected; and configuring items 210-214 to always face the user. More than one view of a scene of the carousel can also be provided to the user on view plane 204. For example, a perspective camera view can give a view of the displayed items from a point at, near, or far away from the scene. A top view or oblique view can give the user a view of the scene from an upper perspective. In some examples, the carousel can be cocked at an angle relative to view plane 204 so as to create different visual effects. Other special visual effects can include, for example, animation and acoustic effects.

Items 210-214 can be displayed in association with slots arranged about the notional carousel. In some implementations, a slot can have a slot identifier and a slot position. The slot position can include, for example, a hit angle held by that slot. The hit angle for a given slot can be used to define the relative position of the slot in a scene of the notional carousel. The number of slots in a particular scene can be any number, including a number not necessarily equal to the number of items. Some slots can have more than one assigned item, or no assigned item. Some items can be unassigned. For example, computing device 100 can display seven slots each containing an item (such as items 210-214) drawn from a larger group of one hundred items. In such case, each progressive revolution of the carousel as depicted on view plane 204 can reveal a set of the next seven items drawn from the larger group of hundred items. In some implementations, such as in the example of FIG. 2, only part of the notional carousel is displayed on view plane 204.

Computing device 100 can receive input signals that can cause computing device 100 to re-present the plurality of items so that they appear to move (on the notional carousel) relative to the central point, placing a different configuration of the plurality of items on view plane 204. In the example implementation of FIG. 2, user input can be entered by the user touching surface of touchscreen device 202 along a input path 206. In this example, input path 206 is an continuous straight line segment; however, input path 206 can also be curved, or defined a loop or other shape, or discontinuous such as if the user were to tap view plane 204 as the user's finger moved across view plane 204. In such case, the user input can be entered/performed by a user's finger touching the surface of touchscreen device 202 at a first location D1 and swiping along an input path 206 (depicted in FIG. 2 by a dotted line) which terminates at a second location D2 on the surface. An input signal indicative of the input path 206 is then generated from this user input at the touchscreen device 202. The input signal can then be received by the CPU 102 via, for example, the interface circuitry. The types of input signals computing device 100 can accept include, but are not limited to, a single touch, a touch and drag, release, a fling, a click or tap, a long click, a swipe, a multi-touch or gesture input such as pan, zoom, rotate, or any other inputs received at touchscreen device 202 or any other input device 112. Input path 206 need not be displayed on touchscreen device 202.

Locations D1, D2 can include coordinates on touchscreen device 202, such as pixel coordinates or normalized coordinates. Locations D1, D2 can also include, for example, bounded areas or other data indicative of a selection of a location or point of contact on touchscreen device 202.

In the depicted example, computing device 100 can process the input signal along input path 206 as a command to render the scene such that the plurality of items appear to the user to have moved from the first example configuration (as shown in FIG. 2) to a second example configuration (as shown in FIG. 3). As seen in FIG. 3, the second example configuration can output thumbnail images of music albums such as 210-216. In FIG. 3, a new thumbnail image 216, which is not displayed in the first configuration, is now displayed in the second configuration, thus giving the impression that thumbnail image 216 has rotated into the scene as the notional carousel spins. By contrast, thumbnails 210-214 from the first configuration of FIG. 2 appear to have moved farther away (in some cases, faded into the background) from the user in the second configuration, thus creating the impression that these items are being rotated out of the scene as the notional carousel spins counterclockwise. In another example (not shown), the input path 206 can be reversed, and the user can perceive a spinning of the carousel for the items 210-214 to be rotated back into the scene as the notional carousel spins clockwise. In these examples, the user perceives a spinning of the carousel, showing a different scene of the plurality of items (such as items 210-216), which enables the user to view and potentially select one or more of the items from a larger collection.

The movement of the carousel from the first to the second configuration can be determined from some geometric characteristic of the input path 206, such as direction, magnitude and/or location, as discussed below in connection with FIG. 4. To provide a satisfying user experience, it is helpful that the perceived movement of the carousel tracks or otherwise relates to the touch gesture or other user input, including in some cases (as shown in FIGS. 2 and 3) where input path 206 does not touch any of the displayed items. In some other cases, input path 206 can encompass a displayed item and the perceived movement of the carousel can track the input path 206.

Figure 4:
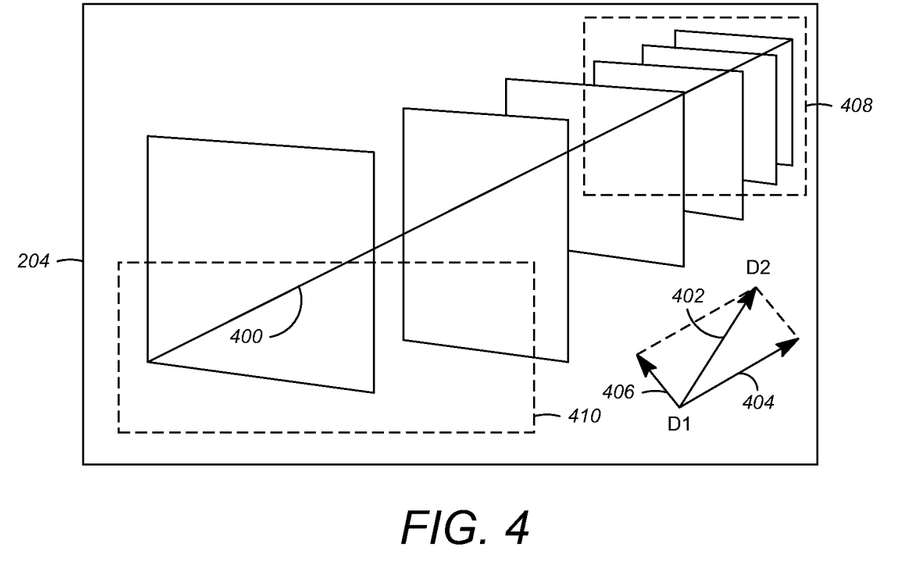
FIG. 4 is a schematic diagram of an example projection of an input path onto an example notional line at a view plane of the display device of FIG. 2.

Referring to FIG. 4, the perceived movement of the carousel can be determined with reference to a spatial relationship between input path 206 and a notional line that can be notionally positioned in space. Notional lines need not be shown on touchscreen device 202. FIG. 4 is a schematic diagram of an example projection of input path 206 onto an example notional line, in this case line 400 on view plane 204 of touchscreen device 202, according to the spatial relationship. In some examples, the notional line can correspond to a trajectory of at least one of the plurality of items 210-216 as it moves relative to the central point. For example, the notional line can be a projection of the trajectory onto the view plane 204. In some other examples, the notional line can approximate the perceived trajectory of the displayed items as they move across the view plane 204 as the carousel spins. The notional line can be a straight line or a curved line. In the example of FIG. 4, notional line 400 is positioned on view plane 204. In some other examples, notional line can be placed at an angle to view plane 204 to give different visual effects when the carousel spins. When the finger moves from location D1 to location D2 along input path 206, computing device 100 can re-render the plurality of items so that the items appear to the user to have moved along the notional line 400 relative to the notional central point.

To determine the apparent movement of the plurality of items, the projection of input path onto the notional line can include projecting all or portions of input path onto the notional line. In some implementations, the projection can include resolving the input path into a first component parallel to the notional line and optionally a second component perpendicular to the notional line. For purpose of illustration, input path 206 is represented by a line segment 402 in FIG. 4, which starts at location D1 and ends at location D2 on view plane 204. As seen in FIG. 4, the resolution of the input path 206 can include resolving line segment 402 into a first component 404 parallel to line 400 and optionally a second component 406 perpendicular to line 400. First component 404 of the projection can include, for example, a magnitude and a direction, from which the apparent movement of the plurality of items can be determined.

In some implementations, the apparent movement of the plurality of items can be determined by identifying at least one coefficient associated with a location of input path 206 on view plane 204, and determining a product of the coefficient and the magnitude of the projection. For example, a coefficient t can be identified for location D1 on input path 206. The magnitude of the projection can be, for example, the magnitude of first component 404. The product of the coefficient and the magnitude of the projection can be determined by, for example, multiplying the magnitude of the projection by the coefficient.

In some implementations, view plane 204 can be divided into a plurality of regions. For example in FIG. 4, a first region 408 is at least partially located in an upper-right quadrant of the view plane 204, and a second region 410 is at least partially located in a lower-left quadrant of the view plane 204. Each region can be assigned a coefficient value for locations that fall into that region. Different regions can have different coefficient values. For example in FIG. 4, region 408 can have a coefficient t1, and region 410 a coefficient t2. Coefficient t1 can have a greater value than t2. When the user's input path is on the top right corner of view plane 204, which falls into region 408, coefficient t1 (the larger value) can be applied to determining the apparent movement of the plurality of items on the notional carousel. When the input path is on the bottom left corner of view plane 204, which falls into region 410, coefficient t2 (the smaller value) can be applied. Thus, the carousel can appear to spin faster when the input path is on the top right corner as compared to when the input path is at the bottom left corner.

In some implementations, determining the apparent movement of the plurality of items can include determining additional information from the user input, such as velocity, acceleration, friction, force, or momentum of the user's finger as it slides along the input path. For example, the faster the user moves the finger, the faster the carousel can appear to spin.

To determine the apparent movement of the plurality of items, a velocity can be determined at least in part from the magnitude of the projection of the input path 206. In some implementations, the velocity can vary over time such that the plurality of items appear to decelerate under a friction force in opposition to the movement imparted by the user input.

In some implementations, such as when the user quickly moves the finger away from touchscreen device 202, the carousel can appear to the user to continue the movement after the gesture input stops. In some other implementations, such as when the user slowly moves the finger on touchscreen device 202, the carousel can stop its movement after the user input stops.

FIG. 5 is a schematic diagram of an example computing device 500, according to another implementation. Computing device 500 can include, for example, a display device 502 outputting a plurality of items, a computing unit 508 that can include a processor and memory (not shown), and an input device, which in this case is a mouse device 504 separate from the display device 502. When the user enters an input (such as a click-and-drag) with the mouse device 504, an input signal indicative of an input path can be generated at the mouse device 504 and received by computing unit 508, as described above. Upon determining the apparent movement of the carousel from the input path, the plurality of items can appear on the display 502 to move relative to a central point as if the user is dragging the plurality of items about a notional carousel. Display device 502 can also be physically separate from computing device 500 and can be operatively and/or physically coupled to computing device 500.

FIG. 6 is a schematic diagram of an example computing device 600, according to another implementation. Computing device 600 can include, for example, a display 602 on which a plurality of items are displayed, a processor and memory (not shown), and a sensor in the form of a video camera 604 operatively coupled to computing device 600. When the user makes a gesture in front of video camera 604, the gesture can be detected by video camera 604 and sent as input signal to computing device 600 indicating an input path on a viewing plane of display 602. The input signal of the input path can be used as described above to determine the apparent movement of the plurality of items on display 602, thus giving the impression that the apparent movement of the plurality of items is controlled by the gesture made in front of the video camera 604.

Figure 7:
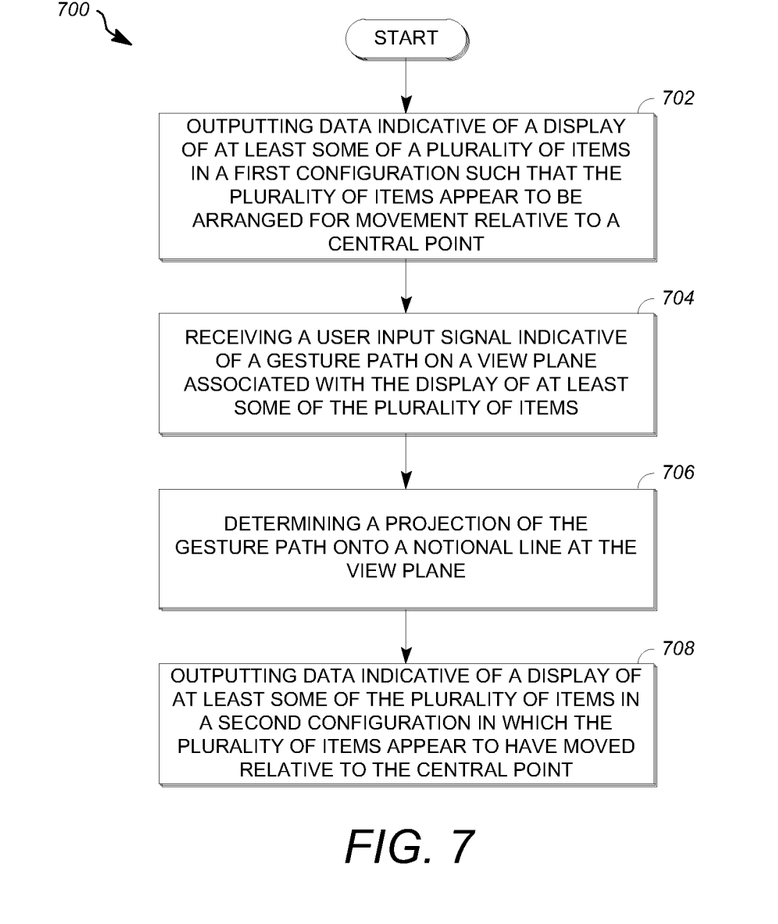
FIG. 7 is a logic flow chart of example operations of the computing device of FIGS. 1-3.

FIG. 7 is a logic flow chart of an example method 700 of operations of computing device 100 of FIGS. 1-3. Method 700 can commence with step 702, where processor 104 of computing device 100 outputs data for presentation at a display device, the data indicating a first configuration of at least some items of the plurality of items, such as items 210-216. The data can be received at touchscreen device 202 (or another suitable display device) via interface circuitry or other suitable means, causing touch screen 202 to display the items.

Touchscreen device 202 can include, for example, view plane 204 on which the items 210-216 can be displayed and/or viewed. As explained above, these items can include text, graphics or both such as thumbnail images of book or album covers. The items are displayed in a first configuration, at view plane 204, such that the plurality of items appear to the user to be arranged for movement relative to a notional central point. In some cases, arrangement of the items may appear to the user as though the items are on a rotating carousel, but this visual effect need not be employed in every case where the items are arranged for movement relative to the central point.

At step 704, computing device 100 receives an input signal indicative of a input path along a view plane associated with the first configuration. The input path can be based on a user input. This user input can be, for example, a user input to touchscreen device 202. The user input can include, for example, the user touching on the first location D1, swiping along input path 206 and terminating at the second location D2, as seen in FIGS. 2 and 3. User input is not limited to gesture input at a touch-sensitive display. Other forms of user input can be used, including inputs entered using a keyboard (such as a cursor arrow key) or a mouse. In such implementations, touchscreen device 202 can be replaced with a display that is not touch sensitive or otherwise does not integrate user input, such as illustrated in FIGS. 5 and 6.

At step 706, a projection of the input path onto a notional line can be determined based on a projection of the input path onto the notional line. The notional line can be, for example, a straight or curved line on view plane 204, or any other line notionally place in space. In some implementations (such as depicted in FIG. 4), the notional line can correspond to a trajectory of at least one of the plurality of items as it appears to move relative to the central point. The projection of the input path can be determined by, for example, calculating, based on the input path 206, a first component (such as line segment 406) parallel to the notional line (such as line 400). Other suitable techniques for determining the projection of the input path can be employed. The notional line need not be displayed to the user but rather can be implemented in one or more computations performed by computing device 100.

At step 708, computing device 100 outputs data for presentation at the display device, the data indicating a second configuration of at least some of the plurality of items 210-216 (see, e.g., FIG. 3) in which the plurality of items 210-216 appear to have moved from the first configuration (see, e.g., FIG. 2) relative to the central point. The apparent movement of the plurality of items 210-216 is based at least in part on the projection of the input path onto the notional line (such as line segment 406 in FIG. 4). In some implementations, determining the apparent movement of the plurality of items further includes determining a magnitude and direction of the projection, identifying at least one coefficient for a location of at least a component of the input path on view plane, and/or determining a product of the coefficient and the magnitude of the projection.

In some implementations, outputting data for presentation at the display device can occur substantially contemporaneously with receiving input signal indicative of input path 206. For example, in such implementations, as the user performs user input indicative of a input path, such as input path 206, the outputting of the plurality of items 210-216 is initiated and concludes so that, from the user's perspective, the apparent movement of the plurality of items 210-216 takes place substantially at the same time as the time when touchscreen device 202 receives the input signal indicative of the input path. Thus, when the user stops entering input indicative of the input path, the apparent movement of the plurality of items 210-216 also stops within a fraction of a second (for example) thereafter.

In some implementations, outputting data for presentation at the display device continues after receiving user input signal indicative of the input path 206. For example, such as when the user quickly moves a finger on touchscreen device 202 (such as in a "fling" gesture), the outputting of the data for presentation at the display device is initiated and continues for a discernible time period after the user has completed entry of the user input indicative of the input path (which in such cases can be shorter than input path 206 as depicted in FIG. 2). The visual effect is, in some example cases, that the user has, through a fling gesture, imparted a force on a carousel, which continues to spin even after the fling gesture is completed.

In some implementations, outputting data for presentation at the display device can include outputting data indicating a series of configurations intermediate of the first configuration and the second configuration such that the plurality of items appear to move from the first configuration to the second configuration in a continuous path. For example, the configurations can be displayed in frames and a plurality of frames can be displayed continuously to show the apparent movement of the plurality of items on touchscreen device 202. The apparent movement of the plurality of items can be displayed at a velocity that is based on a magnitude of the projection. The velocity can vary over time such that the plurality of items appear to decelerate under a friction force in opposition to movement indicated by the input signal.

The term "processor" should be understood to encompass any CPU (whether single or multiple core), microprocessor, microcontroller, ASIC, PLA, optical processor, or any device or group of devices whatsoever that is capable of processing information including groups of the foregoing operating in parallel. The term "memory" means any tangible device or group of devices capable of storing information, where volatile or non-volatile, primary or secondary, including without limitation RAM, ROM, or disk drives.

Further, all or a portion of the disclosed embodiments or implementations can take the form of a computer program product accessible from, for example, a computer-usable or computer-readable medium such as primary memory 104 or any other computer-usable or computer-tangibly contain, store, communicate, or transport the program for use by or in connection with any processor. The medium can be, for example, an electronic, magnetic, optical, electromagnetic, or a semiconductor device. Other suitable mediums are also available. Computer-executable instructions for performing the techniques described herein (including method 700 shown in FIG. 7) can be stored in memory such as primary memory 104 and executed by a computing device such as computing device 100 causing computing device 100 to perform the some or all of the methods and other techniques described above.

The above-described embodiments or implementations have been described in order to allow easy understanding and do not limit the present disclosure. On the contrary, the present disclosure is intended to cover various modifications and equivalent arrangements included within the scope of the appended claims, which scope is to be accorded the broadest interpretation so as to encompass all such modifications and equivalent structure as is permitted under the law.

What is claimed is:

1. A method, comprising:
outputting, by a processor, first data for presentation at a display device, the first data indicating a configuration of at least a first subset of items from a plurality of items such that the plurality of items appear to be arranged for movement relative to a central point;
receiving, by the processor, an input signal indicative of an input path along a view plane associated with the first configuration;
determining, by the processor, a projection of the input path onto a notional line by at least resolving the input path into a first component parallel to the notational line and a second component perpendicular to the notational line, wherein the notational line corresponds to a trajectory of at least one of the plurality of items as it appears to move relative to the central point;
calculating, by the processor, the first component of the input path;
determining, based on a magnitude of the first component of the input path, a configuration of at least a second subset of items from the plurality of items; and
outputting, by the processor, second data for presentation at the display device, the second data indicating the second configuration of at least the second subset of items from the plurality of items in which the plurality of items appear to have moved from the first configuration relative to the central point.

2. The method of claim 1, further comprising:
generating, at the display device, the input signal based on a user input to the display device, the user input defining the input path, wherein:
the display device is a touchscreen device, and
the processor is operatively coupled to the touchscreen device.

3. The method of claim 1, further comprising:
generating the input signal based on a user input to a hand-actuated input device, the user input defining the input path, wherein the processor is operatively coupled to the display device and the hand-actuated input device.

4. The method of claim 1, further comprising:
generating the input signal based on a user input detected by a sensor capable of detecting movement by a user, the user input defining the input path, wherein the processor is operatively coupled to the sensor.

5. The method of claim 1, further comprising:
determining a direction of the projection of the input path onto the notional line; and
determining, based on the magnitude of the first component of the input path and the direction of the projection of the input path, the second configuration.

6. The method of claim 5, wherein outputting, by the processor, second data for presentation at the display device further comprises:
  identifying at least one coefficient;
  determining a product of the at least one coefficient and the magnitude of the projection; and
  determining, based on the product of the at least one coefficient and the magnitude of the first component of the input path, the second configuration.

7. The method of claim 6, wherein identifying the at least one coefficient further comprises:
  identifying a location of at least a component of the input path; and
  determining, based on the location, the at least one.

8. The method of claim 1, wherein outputting, by the processor, second data for presentation at the display device further comprises:
  determining, based on a location of at least a portion of the input path along the view plane, a coefficient; and
  determining, based on the magnitude multiplied by the coefficient, the second configuration.

9. The method of claim 8, wherein determining the coefficient further comprises:
  determining whether the location of at least the portion of the input path is in at least a first or a second region, wherein the coefficient is greater in value if the location is determined to be in the first region than if the location is determined to be in the second region.

10. The method of claim 9, wherein the first region is a region at least partially located in an upper-right quadrant of the view plane.

11. The method of claim 9, wherein the second region is a region at least partially located in a lower-left quadrant of the view plane.

12. The method of claim 1, wherein outputting, by the processor, second data for presentation at the display device occurs substantially contemporaneously with receiving the input signal indicative of the input path.

13. The method of claim 1, wherein outputting, by the processor, second data for presentation at the display device is completed after receiving the input signal indicative of the input path.

14. The method of claim 13, wherein outputting, by the processor, second data for presentation at the display device further comprises:
  outputting data for presentation at the display device, the second data indicating a series of configurations intermediate of the first configuration and the second configuration of at least the second subset of items from the plurality of items such that the plurality of items appear to move from the first configuration to the second configuration in a continuous path.

15. The method of claim 14, wherein the plurality of items appear to move from the first configuration to the second configuration in a continuous path and at a velocity that is based on a magnitude of the projection.

16. The method of claim 15, wherein the velocity varies over time such that the plurality of items appear to decelerate under a friction force in opposition to movement indicated by the input signal.

17. A computing device, comprising:
  at least one memory; and
  at least one processor configured to execute instructions stored at the at least one memory to:
    output first data indicative of a display of at least a first subset of items from the plurality of items in a first configuration such that the plurality of items appear to be arranged for movement relative to a central point;
    receive a user input signal indicative of a input path on a view plane associated with the display of at least a first subset of items from the plurality of items;
    determine a projection of the input path onto a notional line by at least resolving the input path into a first component parallel to a notational line and a second component perpendicular to the notational line, wherein the notional line corresponds to a trajectory of at least one of the plurality of items as it appears to move relative to the central point;
    calculate the first component of the input path;
    determine, based on a magnitude of the first component of the input path, a second configuration of at least a second subset of items from the plurality of items; and
    output second data indicative of a display of at least the second subset of items from the plurality of items in the second configuration in which the plurality of items appear to have moved relative to the central point.

18. The computing device of claim 17, wherein the at least one memory further includes instructions to:
  determine a direction of the projection of the input path onto the notional line; and
  determine, based at least in part on the magnitude of the input path and the direction of the projection of the input path, the apparent movement of the plurality of items.

19. The computing device of claim 17, wherein the at least one memory further includes instructions to:
  determine, based on a location of at least a portion of the input path on the view plane, a coefficient; and
  determine, based at least in part on a product of the magnitude and the coefficient, the apparent movement of the plurality of items.

20. The computing device of claim 17, wherein the at least one memory further includes instructions to:
  output at least some of the plurality of items in a series of rapidly displayed configurations intermediate of the first configuration and the second configuration such that the plurality of items appear to move continuously from the first configuration to the second configuration.

21. A non-transitory computer-readable medium having stored thereon a program of instructions executable by one or more computing devices to cause the one or more computing devices to:
  output, at the one or more computing devices, first data indicative of a display of at least a first subset of items from a plurality of items in a first configuration such that the plurality of items appear to be arranged for movement relative to a central point;
  receive, at the one or more computing devices, a user input signal indicative of a input path on a view plane associated with the display of at least the first subset of items from the plurality of items;
  determine, by the one or more computing devices, a projection of the input path onto a notional line by at least resolving the input path into a first component parallel to the notational line and a second component perpendicular to the notational line, wherein the notional line corresponds to a trajectory of at least one of the plurality of items as it moves relative to the central point;
  calculate the first component of the input path;
  determine, based on a magnitude of the first component of the input path, a second configuration of at least a second subset of items from the plurality of items; and
  output, at the one or more computing devices, second data indicative of a display of at least the second subset of items from the plurality of items in the second configuration in which the plurality of items appear to have moved relative to the central point.

22. The non-transitory computer-readable medium of claim 21, further comprising instructions executable by the one or more computing devices to cause the one or more computing devices to:
   determine a direction of the projection of the input path onto the notional line; and
   determine, based at least in part on the magnitude and the direction of the projection of the input path, the apparent movement of the plurality of items.

23. The non-transitory computer-readable medium of claim 21, further comprising instructions executable by the one or more computing devices to cause the one or more computing devices to:
   determine, based on a location of at least a portion of the input path on the view plane, a coefficient; and
   determine, based at least in part on a product of the determined magnitude and the coefficient, the apparent movement of the plurality of items.

24. The non-transitory computer-readable medium of claim 21, further comprising instructions executable by the one or more computing devices to cause the one or more computing devices to:
   output the plurality of items in a series of rapidly displayed configurations intermediate of the first configuration and the second configuration such that the plurality of items appear to move continuously from the first configuration to the second configuration.

* * * * *